US012734642B2

(12) United States Patent
Rowland et al.

(10) Patent No.: US 12,734,642 B2
(45) Date of Patent: Sep. 15, 2026

(54) SYSTEM AND METHOD FOR CONTROLLING ABRASIVE FLOW IN A PNEUMATIC BLASTING SYSTEM

(71) Applicant: BLASTONE TECHNOLOGY PTY LTD, Derrimut (AU)

(72) Inventors: Matthew David Campbell Rowland, Camberwell (AU); Trevor Andrew Seewald, Upper Kedron (AU)

(73) Assignee: BLASTONE TECHNOLOGY PTY LTD (AU)

( * ) Notice: Subject to any disclaimer, the term of this patent is extended or adjusted under 35 U.S.C. 154(b) by 506 days.

(21) Appl. No.: 18/284,918

(22) PCT Filed: Mar. 30, 2022

(86) PCT No.: PCT/AU2022/050289
§ 371 (c)(1),
(2) Date: Sep. 29, 2023

(87) PCT Pub. No.: WO2022/204758
PCT Pub. Date: Oct. 6, 2022

(65) Prior Publication Data

US 2024/0198485 A1 Jun. 20, 2024

Related U.S. Application Data

(60) Provisional application No. 63/167,672, filed on Mar. 30, 2021.

(30) Foreign Application Priority Data

Mar. 30, 2021 (AU) ................................ 2021900933

(51) Int. Cl.
*B24C 7/00* (2006.01)
*G05D 7/06* (2006.01)

(52) U.S. Cl.
CPC ......... *B24C 7/0053* (2013.01); *G05D 7/0623* (2013.01)

(58) Field of Classification Search
None
See application file for complete search history.

(56) References Cited

U.S. PATENT DOCUMENTS 6,053,803 A 4/2000 Pizzimenti et al.
7,040,959 B1 5/2006 Panuska et al.
(Continued)

FOREIGN PATENT DOCUMENTS

GB 2146807 A 4/1985
JP 2007-130716 A 5/2007
(Continued)

OTHER PUBLICATIONS

EP Office Action, mailed Jan. 27, 2025 (Jan. 27, 2025), in European Application No. 22778213.3. (10 pages).
(Continued)

*Primary Examiner* — Sean Shechtman
(74) *Attorney, Agent, or Firm* — RowanTree Law Group, PLLC; Joseph W. Schmidt

(57) ABSTRACT

An automated abrasive control system 100 is provided for controlling abrasive flow in a pneumatic abrasive blast pot 110 having at least one blast hose 116 (shown coupled to a blast nozzle 115). The pneumatic abrasive blast pot 110 is used for the cleaning and preparation of surfaces in readiness for the application of paint systems or other surface treatment processes. A plurality of sensors accurately measures values of the system operating parameters such as air pressure, temperature, humidity, and abrasive flow rate. The automated abrasive control system 100 includes an abrasive flow sensor 120 for measuring abrasive flow rate through the at least one blast hose 116, an abrasive metering valve 114
(Continued)

for controlling abrasive flow rate through the at least one blast hose 116, and a controller 112 configured to receive a signal from the abrasive flow sensor 120 and actuate the abrasive metering valve 114 based on a set of predetermined conditions such as nozzle size and abrasive media and combinations thereof in order to maintain the abrasive flow rate within an optimum abrasive flow rate range.

15 Claims, 10 Drawing Sheets

(56) References Cited

U.S. PATENT DOCUMENTS

| | | | |
|---|---|---|---|
| 7,297,048 | B1 | 11/2007 | Reilley |
| 2018/0264625 | A1 | 9/2018 | Schneidau et al. |
| 2021/0046611 | A1 | 2/2021 | Ho et al. |

FOREIGN PATENT DOCUMENTS

| | | | |
|---|---|---|---|
| JP | 2017-213651 | A | 12/2017 |
| WO | 2003/055644 | A1 | 7/2003 |
| WO | 2021/021947 | A1 | 2/2021 |

OTHER PUBLICATIONS

International Preliminary Report on Patentability, dated Apr. 3, 2023, for International Application No. PCT/AU22/50289. (5 pages).

International Search Report and Written Opinion, dated Jun. 27, 2022, for International Application No. PCT/AU22/50289. (11 pages).

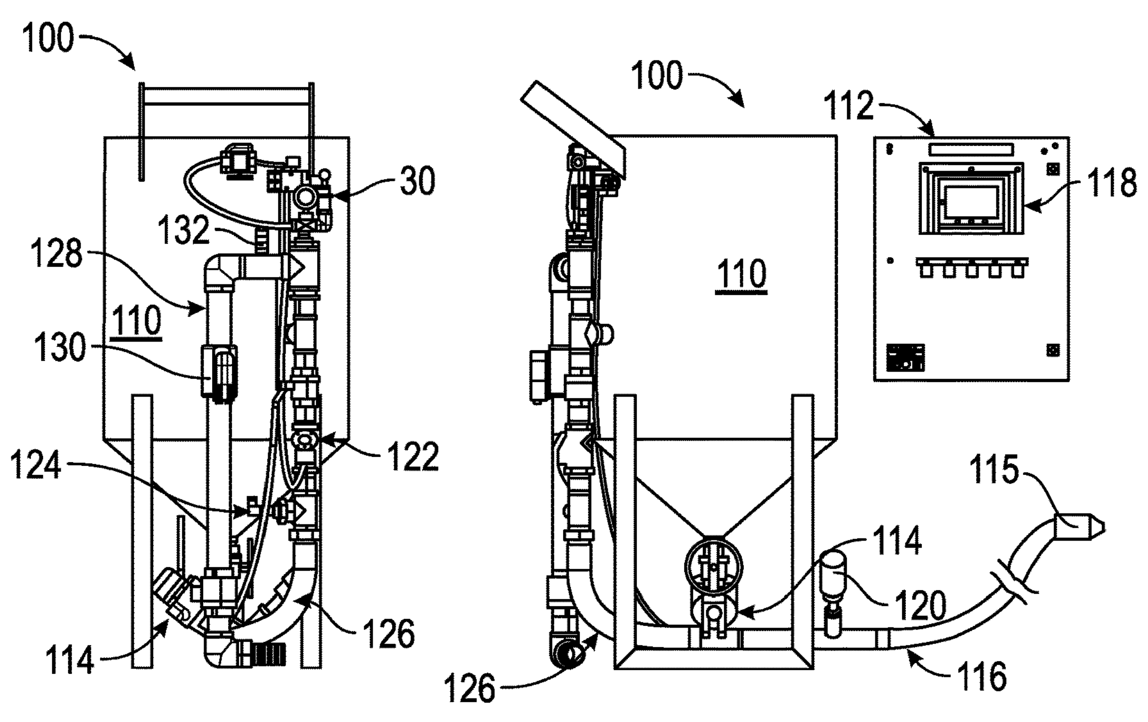
FIG. 2A
FIG. 2B
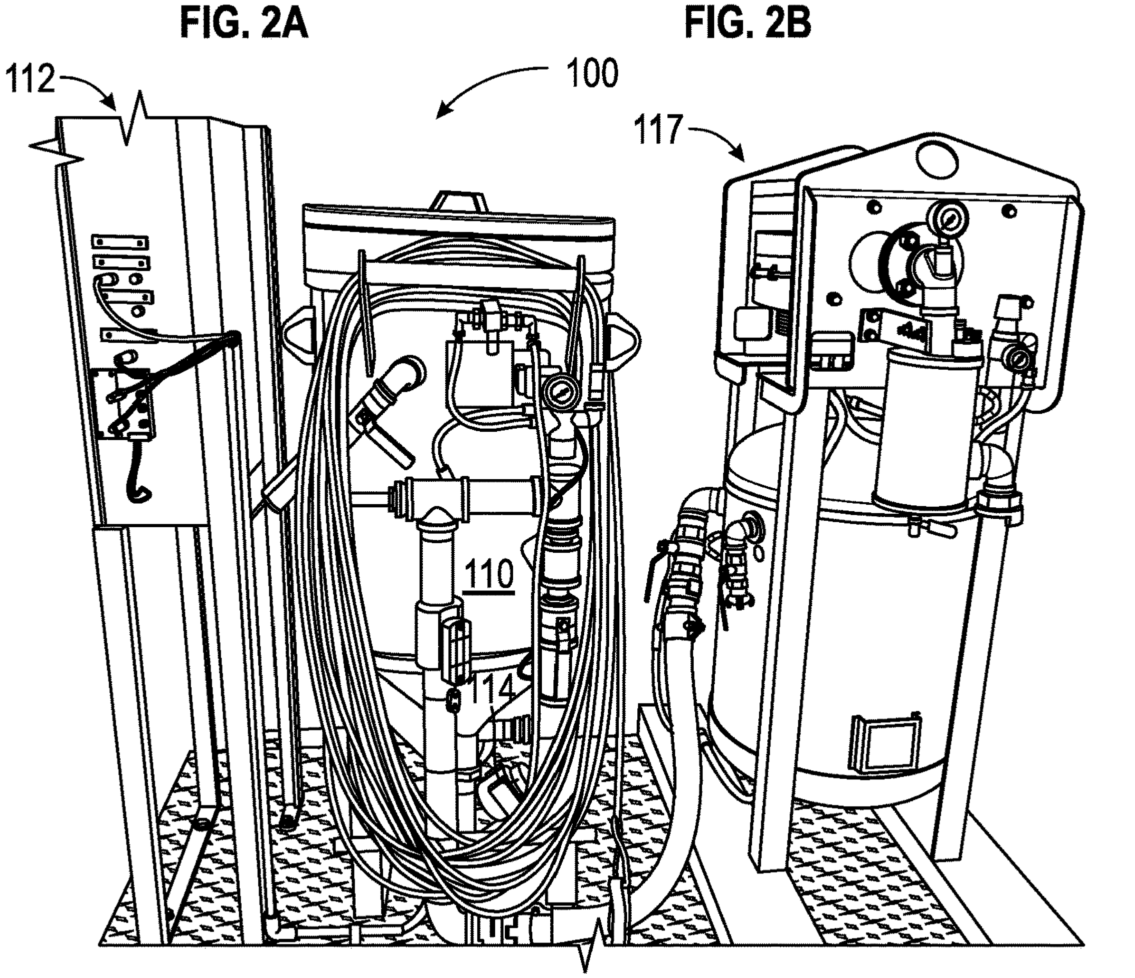
FIG. 3

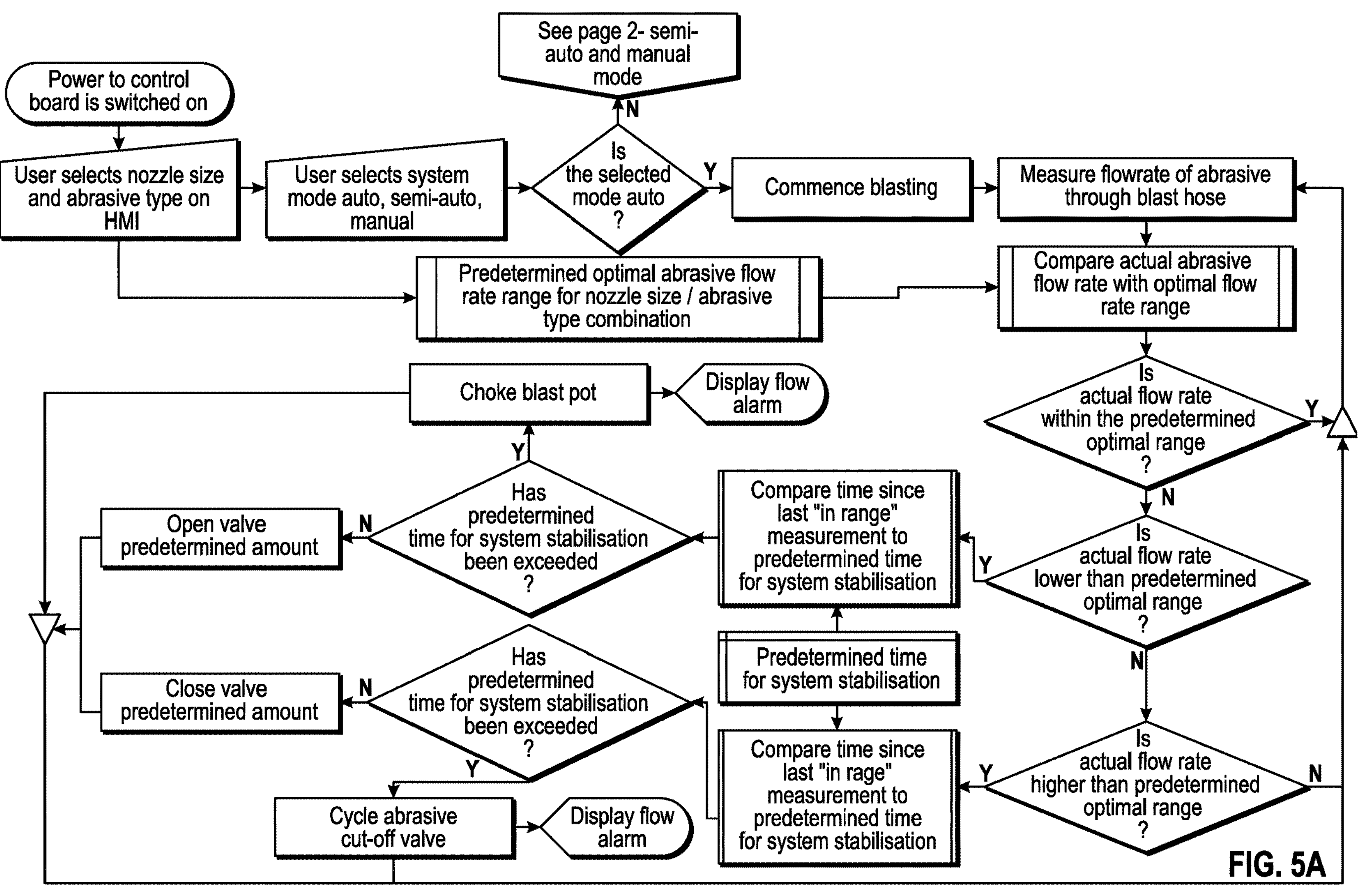
Power to control board is switched on
User selects nozzle size and abrasive type on HMI
User selects system mode auto, semi-auto, manual
Is the selected mode auto ?
N
See page 2- semi-auto and manual mode
Y
Commence blasting
Measure flowrate of abrasive through blast hose
Predetermined optimal abrasive flow rate range for nozzle size / abrasive type combination
Compare actual abrasive flow rate with optimal flow rate range
Is actual flow rate within the predetermined optimal range ?
Y
N
Is actual flow rate lower than predetermined optimal range ?
Y
N
Is actual flow rate higher than predetermined optimal range ?
Y
N
Compare time since last "in range" measurement to predetermined time for system stabilisation
Predetermined time for system stabilisation
Compare time since last "in rage" measurement to predetermined time for system stabilisation
Has predetermined time for system stabilisation been exceeded ?
Y
Choke blast pot
Display flow alarm
N
Open valve predetermined amount
Has predetermined time for system stabilisation been exceeded ?
N
Close valve predetermined amount
Y
Cycle abrasive cut-off valve
Display flow alarm
FIG. 5A

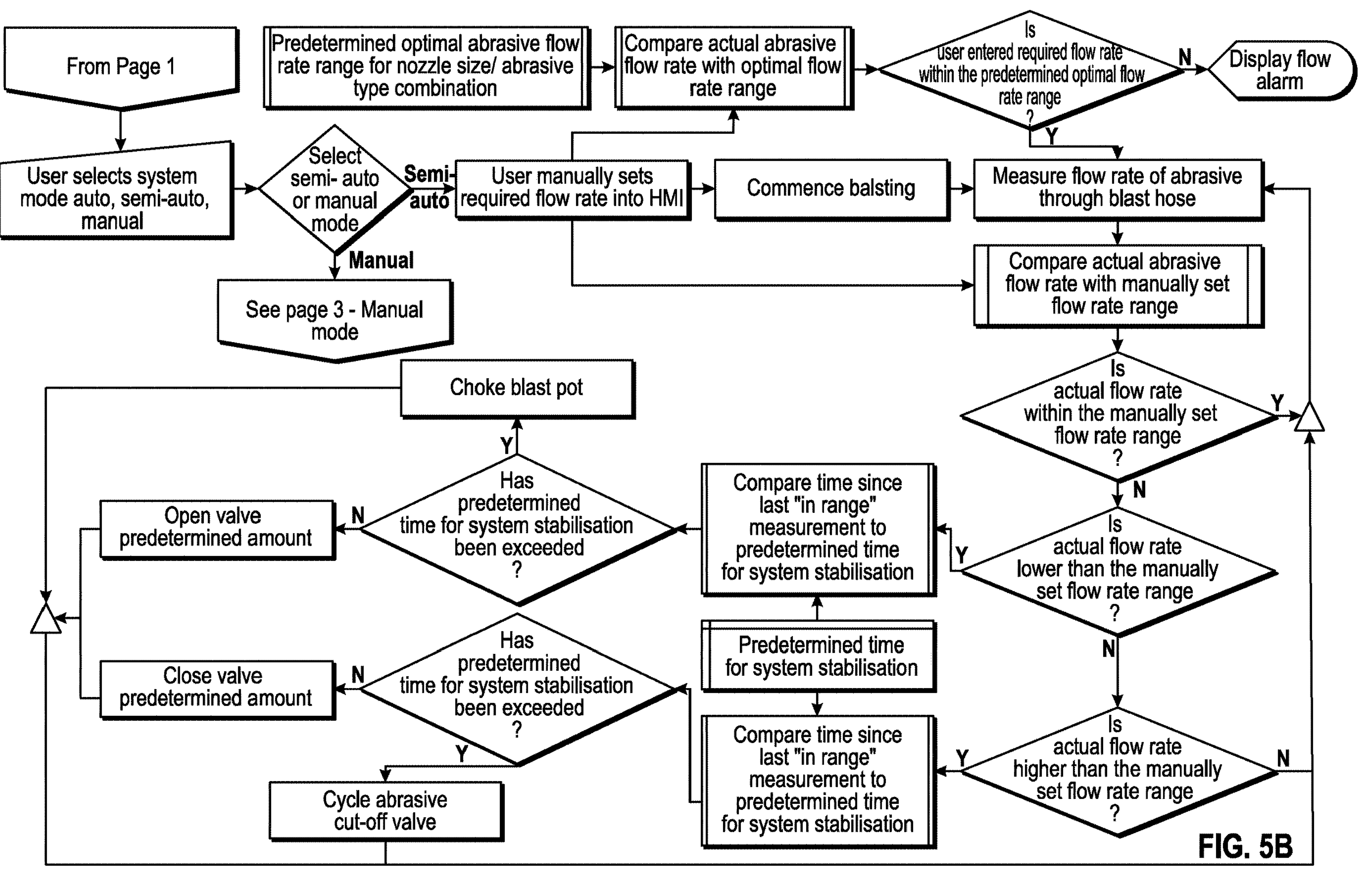

From Page 1
Predetermined optimal abrasive flow rate range for nozzle size/ abrasive type combination
Compare actual abrasive flow rate with optimal flow rate range
Is user entered required flow rate within the predetermined optimal flow rate range ?
N
Display flow alarm
Y
User selects system mode auto, semi-auto, manual
Select semi- auto or manual mode
Semi-auto
User manually sets required flow rate into HMI
Commence balsting
Measure flow rate of abrasive through blast hose
Manual
See page 3 - Manual mode
Compare actual abrasive flow rate with manually set flow rate range
Choke blast pot
Is actual flow rate within the manually set flow rate range ?
Y
Y
Has predetermined time for system stabilisation been exceeded ?
N
N
Open valve predetermined amount
Compare time since last "in range" measurement to predetermined time for system stabilisation
Y
Is actual flow rate lower than the manually set flow rate range ?
N
Has predetermined time for system stabilisation been exceeded ?
N
Close valve predetermined amount
Predetermined time for system stabilisation
Y
Cycle abrasive cut-off valve
Compare time since last "in range" measurement to predetermined time for system stabilisation
Y
Is actual flow rate higher than the manually set flow rate range ?
N
FIG. 5B Nozzle

| Hose 1 | Hose 2 | Hose 3 | Hose 4 |
|---|---|---|---|
| Nozzle 1 | Nozzle 1 | Nozzle 1 | Nozzle 1 |
| Nozzle 2 | Nozzle 2 | Nozzle 2 | Nozzle 2 |
| Nozzle 3 | Nozzle 3 | Nozzle 3 | Nozzle 3 |
| Nozzle 4 | Nozzle 4 | Nozzle 4 | Nozzle 4 |
| Nozzle 5 | Nozzle 5 | Nozzle 5 | Nozzle 5 |
| Nozzle 6 | Nozzle 6 | Nozzle 6 | Nozzle 6 |

Select Abrasive Close

Friday, September 18, 2020
3:27:46 PM

Alarm

Current User:
Engineer

| Data and Time ▿ | Name | Message | Status |
| --- | --- | --- | --- |
| **9/18/2020 11:15:40 AM** | **TT05_L_Alm** | **Low Inlet Temperature Alarm** | **Alarm Raised** |
| 9/18/2020 11:15:36 AM | AI_N2_Ch5_OR_Alm | Analogue Input 05 (Dew Point) Over Range Alarm | Alarm Raised |

Alarm Reset
Alarm History

Main
Hose 1
Hose 2
Hose 3
Hose 4
Alarm

SYSTEM AND METHOD FOR CONTROLLING ABRASIVE FLOW IN A PNEUMATIC BLASTING SYSTEM

FIELD

The present disclosure relates to a system and method for controlling abrasive flow through a pneumatic blasting apparatus.

BACKGROUND

Any references to methods, apparatus or documents of the prior art or related art are not to be taken as constituting any evidence or admission that they formed, or form, part of the common general knowledge.

It is known to provide a blasting apparatus in which particles of abrasive material entrained in a stream of pressurised gas, most usually air, are expelled from a nozzle in a high velocity jet of the air that is directed onto a surface in order that the particles forcibly impact the surface to clean and/or abrade the surface.

One commonly used abrasive material is sand, and when sand is used the blasting process may be referred to as sand blasting. However, other abrasive materials may be used, such as garnet.

FIG. 1 shows a known electrically activated blast pot arrangement. The blast pot 10 contains an abrasive material and is capable of being pressurised (via the compressed air inlet 26) to an optimal pressure required for the blasting process—typically 80 to 120 psi. A depressurisation valve 20 provides a mechanism to depressurise the blast pot 10, and a pressure relief valve 24 restricts the high pressure to 150 psi. The blast pot 10 can have a single abrasive outlet port or multiple abrasive outlet ports. A moisture separator 28 removes moisture from the airstream before it enters the blast pot 10. An abrasive flow metering valve 14 couples the blast pot abrasive outlet port and a blast hose 16 through which the abrasive media, mixed with compressed air from the pusher line 12 flows. This abrasive material and air mixture moves through the blast hose 16 to the hose outlet where it passes through an abrasive blasting nozzle (not shown) and is directed onto the work surface to be treated.

The abrasive flow metering valve 14 is adjustable to control the flow of abrasive material from the blast pot 10 into the blast hose 16. The abrasive metering valve 14 is typically manually adjusted to control flow of abrasive material. A deadman handle (not shown) activates/deactivates a control valve 18 which in turn activates/deactivates an auto air valve 22 resulting in pressurised air flow being supplied to or cut off to the blast hose 16.

The operation of the control valve 18 can be via either pneumatic or electrical means.

An auto air valve, or solenoid valve 22 on the pusher line 12 may be used to shut off pressurised air supply to the blast hose 16 thereby creating a choking effect to force any blockages in the abrasive metering valve 14 out and into the blast hose 16.

Various blasting hardware configurations can be used with the pneumatic blasting system. This includes but is not limited to different sized abrasive blasting nozzles, blast hose diameters commonly in use in the industry and other activation and control devices known to those skilled in the art.

In order to minimise the use of resources and reduce the time to complete surface preparation processes, it is preferable to optimise the operation of the abrasive blasting process. Factors such as type of abrasive material, size of the blast nozzle, blast hose pressure and abrasive flow rate are critical to optimising the abrasive blasting process. It is accepted that the optimal abrasive flow rate for the abrasive blasting process is different depending on the type of abrasive material and the size of the blast nozzle being used. It is also accepted that the optimal air pressure for abrasive blasting is typically 100 psi. An obstacle to optimising the blasting process is that blasting operators have varying levels of experience and may not have the ability to set the abrasive flow rate to the optimal rate or they may choose not to set the abrasive flow rate to the optimal level. Blasting operators may also not set the blasting air pressure to the optimum pressure.

In traditional systems the abrasive flow rate is manually set by the operator by trial and error and, for the reasons outlined above may result in a less than optimal ratio of abrasive material to air being used, for example the operator may visually inspect the air and abrasive mixture issuing from the nozzle An optimal air/abrasive mixture will be only slightly visible in the stream from the nozzle and will appear as a coloured haze. This adjustment is typically affected by the operator stopping the blasting process, moving from the location where the blasting is being carried out to the abrasive metering valve 14 located underneath the blast pot 10, adjusting the abrasive metering value by an estimated amount, and then returning to the blasting location to recommence blasting and test if the adjustment resulted in the correct flow rate of abrasive. Whilst this adjustment of the abrasive metering valve 14 can also be done by a blast pot attendant or other assistant, thus eliminating travel time between locations, the adjustment is still reliant on operator judgement.

It has been known to manually adjust the rate of abrasive flow using control switches mounted near to the blasting nozzle. However, these remote manual adjustment methods continue to rely on operator judgement of the correct flow rate of abrasive material for the specific abrasive type and blasting nozzle size combination being used and only overcome the inconvenience of the operator having to stop blasting while the abrasive flow is adjusted on the abrasive metering valve at the location of the blast pot. Whilst various abrasive metering valve configurations and methods for actuating the abrasive metering valve can be used, these methods continue to rely on operator judgement. As a result, the flow rate of abrasive material is often not optimised for the abrasive type and nozzle size combination being used and results in the abrasive blasting process consuming more than the optimal amount of abrasive material and/or taking more time to complete.

It is an object of the present invention to provide a system and method for optimising abrasive flow in a pneumatic blasting apparatus, or to at least address one or more of the drawbacks discussed above.

SUMMARY OF THE INVENTION

In one aspect there is provided a system and method for automatically controlling abrasive flow through a blast hose by storing operational data, converting the data into user operational information, displaying the information on a user interface display screen, and communicating with remote devices via a compatible wireless mobile network to display and select system parameters.

In an aspect of the present invention there is provided an automated abrasive control system for controlling abrasive flow in a pneumatic abrasive blast pot arrangement having at least one blast hose, the control system including:

an abrasive flow sensor for measuring abrasive flowrate through the at least one blast hose;

an abrasive metering valve for controlling abrasive flowrate through the at least one blast hose; and a controller configured to receive a signal from the abrasive flow sensor and actuate the abrasive metering valve based on a set of conditions, the set of conditions including an optimum abrasive flow rate range having an upper limit and a lower limit, and wherein the controller is configured to determine the optimum abrasive flow rate range based on a combination of nozzle size and abrasive type.

In an embodiment, the controller is configured to operate in three Modes:

A. Auto—The controller is configured to optimise the use of abrasive during the blasting process by automatically adjusting the abrasive flow rate to remain within the optimum abrasive flow rate range for the nozzle size and abrasive type combination in use.

B. Semi-Auto—The controller is configured to adjust the abrasive usage to a flow rate set by the operator.

C. Manual—The controller is configured to allow the operator to manually set an abrasive flow rate.

In an embodiment the controller is configured to continuously receive the signal from the abrasive flow sensor and actuate the abrasive metering valve. In an embodiment the controller is configured to continuously receive the signal from the abrasive flow sensor at a predetermined frequency to allow the abrasive control system to stabilise after the abrasive metering valve has been actuated.

In an embodiment an emergency stop button is included, configured to shut off the compressed air entering the pot when activated.

In an embodiment the controller is configured to compare the measured, or actual abrasive flow rate sensed by the abrasive flow sensor with a predetermined optimum flow rate range for the selected nozzle size and abrasive type combination. The controller is configured to increase flow of abrasive by actuating, or opening, the abrasive metering valve if the actual flow of abrasive sensed is lower than the lower limit of the predetermined optimum flow rate range of abrasive flow for the selected nozzle size and abrasive type combination. If the actual flow of abrasive sensed is higher than the higher limit of the predetermined optimum flow rate range of abrasive flow for the selected nozzle size and abrasive type combination, the controller is configured to reduce flow of abrasive by actuating, or closing, the abrasive metering valve.

In an embodiment, the abrasive metering valve opens or closes based on a differential between the actual flow rate and the predetermined optimum flow rate.

In a preferred embodiment the automated abrasive control system includes a user interface display screen in communication with the controller and configured to display actual instantaneous system operating parameters and operating trends.

In an embodiment, the control system is configured to select and update the system operating parameters and settings from a remote location via electronic devices wirelessly connected to the controller.

In an embodiment, the controller is configured to compare the measured abrasive flow rate sensed by the abrasive flow sensor with the optimum abrasive flow rate range, and if the measured flow rate is outside the optimum abrasive flow rate range the controller actuates the abrasive metering valve to either open or close until the measured abrasive flow rate is within the optimum abrasive flow rate range.

In an embodiment, the controller is configured to open the abrasive metering valve if the measured abrasive flow rate is lower than the lower limit of the optimum abrasive flow rate range for the selected nozzle size and abrasive type combination and close the abrasive metering valve if the measured abrasive flow rate is higher than the higher limit of the optimum abrasive flow rate range for the selected nozzle size and abrasive type combination.

In an embodiment, the automated control system includes a solenoid, or auto air valve for controlling air flow to the blast hose, and wherein when the measured abrasive flow rate is lower than the lower limit of the optimum abrasive flow rate range for a predetermined amount of time, for example, in the case of a blockage in the abrasive metering valve, the controller is configured to actuate the solenoid valve repeatedly several times to promote a higher pressure in the blast pot than in the blast hose when the solenoid valve is closed to remove blockages from the abrasive metering valve or blast hose. This is operation is referred to as choking.

In one embodiment at least one blast pot includes a plurality of blast hoses, each with a respective abrasive flow rate sensor and abrasive metering valve, and the controller is configured to independently monitor flow rate signals from each abrasive flow rate sensor and to independently actuate each respective abrasive metering valve based on the set of predetermined conditions.

In an embodiment, the controller is configured to selectively provide a plurality of abrasive blasting nozzle sizes to be used during blasting operations. In an embodiment, the controller is configured to selectively provide a plurality of abrasive types to be used during blasting operations, and the controller is configured to provide the optimum abrasive flow rate range for the selected nozzle size and abrasive type combination.

Another aspect of the present invention provides an automated control system for a pneumatic abrasive blast pot arrangement, the control system including:

a plurality of sensors configured to measure system operating parameters;

a controller in communication with the plurality of sensors and configured to store the measured system operating parameters; and a user interface display screen in communication with the controller and configured to display the system operating parameters.

In an embodiment the plurality of sensors includes an air pressure sensor connected to the controller, wherein the air pressure sensor measures air pressure of air entering the blast pot during operations (inlet pressure). The measured inlet pressure may be displayed on the user interface display screen. In an embodiment, the controller compares the actual, or measured inlet pressure with a predetermined optimal inlet pressure range, if the measured inlet pressure is outside the predetermined optimum range the controller is configured to trigger an inlet pressure alarm and display a warning on the user interface display screen.

In an embodiment, the plurality of sensors includes an air temperature sensor connected to the controller to measure air temperature of air entering the blast pot during operations (inlet temperature) and a dew point sensor connected to the controller to measure the dew point of air entering the blast pot during operations, wherein the controller is configured to display the measured, or actual, inlet temperature and the measured, or actual dew point, on the user interface display screen. In an embodiment, the controller is configured to compare the measured inlet temperature with the measured dew point, and if the inlet temperature is equal to dew point for a predetermined period of time the controller is configured to trigger a high air moisture content alarm and display a warning on the user interface display screen.

In an embodiment, the plurality of sensors includes a pressure transducer connected to the controller to measure air pressure in the blast hose and display the air pressure on the user interface display screen.

In an embodiment, the controller is configured to compare air pressure measured in the blast control line with a predetermined optimal pressure range, and if the measured pressure in the blast control line is outside the predetermined optimum range the controller is configured to trigger a hose high or low pressure alarm (depending on actual pressure in the hose) and display a warning on the user interface display screen.

In an embodiment, the plurality of sensors includes an air pressure sensor for measuring air pressure prior to the abrasive flow valve (pusher line), and the controller is configured to log when the air pressure prior to the abrasive flow valve (pusher line) is above a predetermined minimum pressure, indicating the blast hose is in operation.

In an embodiment the controller is configured to log data from the plurality of sensors for subsequent downloading to another computational device for in depth analysis and reporting. In an embodiment, information downloaded from the controller may be processed and displayed on the user interface display screen. In an embodiment, the user interface display screen may be positioned remote from the abrasive blasting pot.

In an embodiment, the plurality of sensors includes a Global Positioning System connected to the controller. In an embodiment, the controller is configured to log the location of the pneumatic abrasive blast pot during operation.

In an embodiment, the controller is configured to trigger an alarm if any of the measured system operating parameters is outside a predetermined range.

In an embodiment, the system operating parameters include air pressure entering the blast pot.

In an embodiment, the system operating parameters include air temperature entering the blast pot.

In an embodiment, the system operating parameters include dew point of air entering the blast pot.

In an embodiment, the controller is configured to compare the measured air temperature of air entering the blast pot with the measured dew point of air entering the blast pot, and if the measured air temperature is equal to the dew point for a predetermined period of time the controller is configured to trigger an alarm and display a warning on the user interface display screen.

A further aspect of the present invention provides a method for automatically controlling abrasive flow in a pneumatic abrasive blast pot arrangement having at least one blast hose, the method including:

- providing a sensor for measuring abrasive flow rate through each of the at least one blast hose;
- providing an abrasive metering valve responsive to the sensor;
- providing a controller in communication with the sensor and the abrasive metering valve;
- inputting at least one predetermined optimum abrasive flow rate range having an upper limit and a lower limit, for a combination of nozzle size and abrasive type, into the controller;
- inputting a selected nozzle size and abrasive type combination into the controller, the controller being configured to determine an optimum abrasive flow rate range from the at least one predetermined optimum abrasive flow rate range based on the selected nozzle size and abrasive type combination;
- measuring the abrasive flow rate through the at least one blast hose to determine a measured abrasive flow rate;
- comparing using the controller, the measured abrasive flow rate with the optimum abrasive flow rate range; and
- if the measured flow rate is outside the optimum abrasive flow rate range actuating via the controller the abrasive metering valve to open or close the abrasive metering valve to thereby bring the measured flow rate within the optimum abrasive flow rate range.

In an embodiment, if the measured flow rate is higher than the optimum abrasive flow rate upper limit the controller actuates the abrasive metering valve to close a predetermined amount.

In an embodiment, if the measured abrasive flow rate is lower than the optimum abrasive flow rate lower limit the controller actuates the abrasive metering valve to open a predetermined amount.

In one embodiment the method includes the steps:

- storing a predetermined time limit for the measured abrasive flow rate to be out of range in the controller;
- timing how long the measured abrasive flow rate is out of range; and signalling an alarm if the out of range time exceeds the predetermined time limit.

In a further aspect there is provided an automated abrasive control system for controlling abrasive flow in a pneumatic abrasive blast pot arrangement having at least one blast hose, the automated abrasive control system including:

- an abrasive flow sensor for measuring abrasive flow rate through the at least one blast hose;
- an abrasive metering valve for controlling the abrasive flowrate through the at least one blast hose; and
- a controller configured to receive a signal from the abrasive flow sensor and actuate the abrasive metering valve based on a set of conditions, the set of conditions including an optimum abrasive flow rate range having an upper limit and a lower limit.

In an embodiment the controller is configured to determine the optimum abrasive flow rate range based on a combination of nozzle size and abrasive type.

In an embodiment the controller is configured to compare an actual abrasive flow rate sensed by the abrasive flow sensor with the optimum abrasive flow rate range, and if the actual abrasive flow rate is outside the optimum abrasive flow rate range to actuate the abrasive metering valve to either open or close until the actual abrasive flow rate sensed by the abrasive flow sensor is within the optimum abrasive flow rate range.

In an embodiment the controller is configured to open the abrasive metering valve if the actual abrasive flow rate is lower than the lower limit of the optimum abrasive flow rate range and wherein the controller is configured to close the abrasive metering valve if the actual abrasive flow rate is higher than the upper limit of the optimum abrasive flow rate range.

In an embodiment the controller is configured to either open or close the abrasive metering valve based on a differential between the actual abrasive flow rate and the upper limit of the optimum abrasive flow rate range or the lower limit of the optimum abrasive flow rate range.

In an embodiment the at least one blast hose comprises a plurality of blast hoses, each with a respective abrasive flow rate sensor and an abrasive metering valve, and the controller is configured to independently monitor flow rate signals from each abrasive flow rate sensor and to independently actuate each respective abrasive metering valve.

In an embodiment the automated abrasive control system further includes a solenoid valve positioned on the at least one blast hose, wherein the controller is configured to send toggle signals to the solenoid valve if the abrasive flow rate is below the lower limit for a predetermined period, so that the solenoid valve closes and opens several times, promoting a higher pressure in the pneumatic abrasive blast pot arrangement than in the blast hose and forcing possible blockages in the abrasive metering valve out and into the blast hose.

In an embodiment the controller is configured to receive a signal from the abrasive flow sensor and trigger an alarm based on a set of predetermined conditions.

In an embodiment the automated abrasive control system includes:

- a plurality of sensors configured to measure system operating parameters, wherein the controller is responsive to the plurality of sensors; and
- a user interface display screen in communication with the controller wherein the controller is configured to operate the user interface display screen to display measured values of the system operating parameters.

In an embodiment the controller is configured to trigger an alarm if any of the measured system operating parameters are outside a predetermined range.

In an embodiment the system operating parameters include air pressure entering the pneumatic abrasive blast pot arrangement.

In an embodiment the system operating parameters include air temperature entering the pneumatic abrasive blast pot arrangement.

In an embodiment the system operating parameters include dew point of air entering the pneumatic abrasive blast pot arrangement.

In an embodiment the controller is configured to compare a measured air temperature of air entering the pneumatic abrasive blast pot arrangement with a measured dew point of air entering the pneumatic abrasive blast pot arrangement, and if the measured air temperature is equal to the dew point for a predetermined period of time the controller is configured to trigger an alarm and display a warning on the user interface display screen.

In a further aspect of the present invention there is provided a method for automatically controlling abrasive flow in a pneumatic abrasive blast pot arrangement having at least one blast hose, the method including:

- providing a sensor for measuring abrasive flow rate through each of the at least one blast hose;
- providing an abrasive metering valve responsive to the sensor;
- providing a controller in communication with the sensor and the abrasive metering valve;
- inputting at least one optimum abrasive flow rate range having an upper limit and a lower limit into the controller;
- measuring the abrasive flow rate through the at least one blast hose to determine a measured abrasive flow rate;
- comparing, using the controller, the measured abrasive flow rate with the optimum abrasive flow rate range; and
- if the measured flow rate is outside the optimum abrasive flow rate range actuating via the controller the abrasive metering valve to open or close the abrasive metering valve to thereby bring the measured flow rate within the optimum abrasive flow rate range.

In an embodiment the optimum abrasive flow rate range is based on nozzle size and abrasive type combination.

In an embodiment if the measured flow rate is higher than the upper limit of the optimum abrasive flow rate range the controller actuates the abrasive metering valve to close.

In an embodiment if the measured abrasive flow rate is lower than the lower limit of the optimum abrasive flow rate range then the controller actuates the abrasive metering valve to open.

In an embodiment the method includes:

- storing a predetermined time limit for the measured abrasive flow rate to be out of range in the controller;
- timing how long the measured abrasive flow rate is out of range; and signalling an alarm if the measured abrasive flow rate is out of range for a time that exceeds the predetermined time limit.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 2A shows a front view of an automated abrasive control system in accordance with an embodiment of the present invention, fitted to an abrasive blasting pot;

FIG. 2B shows a side view of the automated abrasive control system in FIG. 2A;

FIGS. 3 and 4 are further views of the automated abrasive control system of FIGS. 2A and 2B also showing an air prep unit 117 for supplying moisture reduced air to the automated abrasive control system.

FIG. 5A shows a first page of a flowchart, being a page of the flowchart depicting a method for automatically controlling abrasive flow in a pneumatic blasting apparatus in accordance with another embodiment of the present invention;

FIG. 5B shows a second page of the flowchart, being a page of the flowchart depicting a method for semi-automatically controlling abrasive flow in a pneumatic blasting apparatus;

DETAILED DESCRIPTION OF A PREFERRED EMBODIMENT

Figure 1:
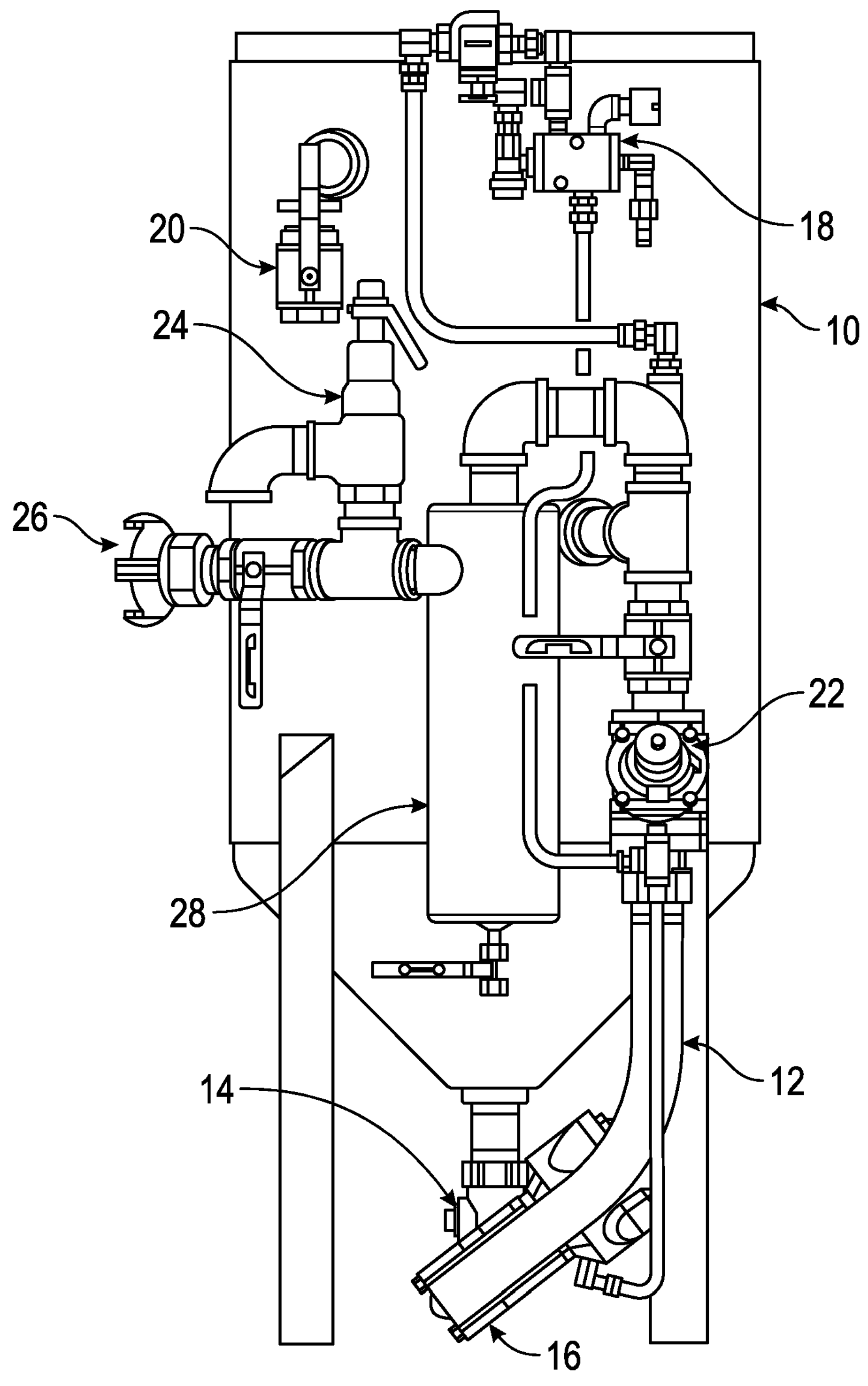
FIG. 1 is a known abrasive blasting pot arrangement.

FIGS. 2A and 2B show an automated abrasive control system 100 for controlling abrasive flow in a pneumatic abrasive blast pot 110 having at least one blast hose 116 (shown coupled to a blast nozzle 115) in accordance with an embodiment of the present invention. The pneumatic abrasive blast pot 110 is used for the cleaning and preparation of surfaces in readiness for the application of paint systems or other surface treatment processes. A plurality of sensors (described below) accurately measures values of the system operating parameters such as air pressure, temperature, humidity, and abrasive flow rate.

The automated abrasive control system 100 includes an abrasive flow sensor 120 for measuring abrasive flow rate through the at least one blast hose 116, an abrasive metering valve 114 for controlling abrasive flow rate through the at least one blast hose 116, and a controller 112 configured to receive a signal from the abrasive flow sensor 120 and actuate the abrasive metering valve 114 based on a set of predetermined conditions such as nozzle size and abrasive media and combinations thereof.

A range of abrasive media commonly used in the industry can be used with the automated abrasive control system 100. Different types of abrasive media have varying densities and flow characteristics and thus need to be considered differently in conjunction with blast nozzle size to provide an optimal abrasive flow rate.

A scientifically repeatable method to determine the optimal abrasive flow rate for the selected abrasive type and nozzle size combination has been developed that makes use of an automated robotic blast cabinet to ensure input parameters can be held constant whilst varying the value of a single input parameter to determine the impact of varying that single input parameter on blasting performance. These parameters include:

1. hose outlet pressure
2. nozzle standoff distance from the workpiece
3. angle of inclination of the nozzle to the workpiece
4. velocity the nozzle moves across the workpiece
5. type of abrasive used
6. surface condition of the workpiece
7. abrasive flow rate through the nozzle outlet This allowed the blasting performance of various combinations of input parameters to be tested under controllable conditions and the optimum abrasive flow rate for the nozzle size and abrasive type combination to be determined. The following input parameters were held constant during the determination of the optimal abrasive flow rate:

| | |
|---|---|
| 1. Hose outlet Pressure | 100 psi |
| 2. Nozzle standoff distance | 600 mm |
| 3. Angle of inclination | 90 degrees |
| 4. Nozzle velocity | No. 6 Nozzle - 0.1 meters/second |
| | No. 7 Nozzle - 0.1 meters/second |
| | No. 8 Nozzle - 0.17 meters/second |
| 5. Type of abrasive used | GMA Garnet - new/unused SpeedBlast |
| 6. Surface condition | Powder coated - average coating thickness |
| | No. 6 Nozzle - 350 μm |
| | No. 7 Nozze - 338 μm |
| | No. 8 Nozzle - 266 μm |

The abrasive flow rate was changed for each test and the blasting performance for that test was recorded.

The methodology used was as follows:

1. Select the nozzle size and abrasive type combination for which the optimal abrasive flow rate is to be determined.
2. Set the input parameters to be held constant (as per above) on the robotic blast cabinet.
3. Set the abrasive flow rate to the minimum setting.
4. Blast a test strip at the minimum abrasive flow rate setting.
5. Measure the maximum width of the blast pattern on the workpiece that would be classed as a Class 3 prepared surface.
6. Incrementally increase the abrasive flow rate setting and blast a test strip at this setting.
7. Measure the maximum width of the blast pattern on the workpiece that would be classed as a Class 3 prepared surface.
8. Repeat steps 6 and 7 until the maximum abrasive setting is reached.
9. Compare the width of the blast patterns for each test strip and convert this into an area per hour cleaning rate. The optimum abrasive flow rate setting is the setting that produces the highest area/hour cleaning rate.

The abrasive flow sensor 120 may be calibrated to accurately measure the flow rate and output a signal to the controller 112. Various abrasive types can be saved into the memory of the controller 112 and can be selected to match the abrasive media being used in the system. The abrasive flow sensor 120 is positioned on the blast hose 116 and is in communication with the controller 112. The controller 112 is configured to compare the actual abrasive flow rate measured by the abrasive flow sensor 120 with a predetermined optimum flow rate range based on the predetermined conditions such as nozzle size and abrasive type combination.

For example, the Inventors have determined optimal abrasive flow rates as shown in Table 1 for GMA Garnet Speedblast abrasive (https://www.gmagarnet.com/en-au/abrasive-blasting/speedblast)

TABLE 1

Example Optimal Abrasive Flow Rates

| Abrasive Type | Hose Pressure | Nozzle size | Optimal Abrasive flow rate range |
|---|---|---|---|
| First time use GMA Garnet - Speedblast | 100 psi | No. 6 | 278 kg/hr +/− 5% |
| First time use GMA Garnet - Speedblast | 100 psi | No. 7 | 381 kg/hr +/− 5% |
| First time use GMA Garnet - Speedblast | 100 psi | No. 8 | 446 kg/hr +/− 5% |

The optimal abrasive flow rates shown in Table 1 above are valid at standard atmospheric conditions of sea level pressure at 25 degrees C. For example, the optimal abrasive flow rate range for Nozzle size No. 6 for the pressure and abrasive type specified in Table 1 extends from a lower limit of (278-5% of 278) kg/hr to an upper limit of (278+5% of 278) kg/hr, i.e. from 264 kg/hr to 292 kg/hr. Different optimal flow rates will be relevant for different atmospheric conditions. The optimal abrasive flow rates shown in Table 1 will change depending on surface type and coating thickness. It will be realised that other optimal abrasive flow rates for different combinations of nozzle size, hose pressure and abrasive type can be determined through the systematic testing method that has previously been described.

As mentioned above one or more sensors are provided to accurately measure a plurality of system operating parameters such as air pressure, temperature, humidity, and abrasive flow rate. The arrangement shown in FIG. 2A includes a single sensor 130 that measures air flow, air pressure and temperature in the pusher line 126. It will be understood that multiple sensors may also be used. A dew point sensor 132 measures dew point of incoming air. The controller 112 is configured to receive data from the sensors and to process the data into operator usable information.

The data may be displayed on a user interface display screen 118, which may be positioned directly on the controller 112, or alternatively, may be positioned remotely from the controller 112 for convenient access. The data is used to monitor and/or control system parameters such as air pressure and abrasive flow rate to maintain a predetermined abrasive flow rate. For example, if air pressure is out of range an alarm is triggered, and if flow rate is out of range it is adjusted via the abrasive metering valve 114. The controller 112 can be positioned at any convenient location and preferably inside an IP66 rated ingress protection control system enclosure (dust tight & protection from high pressure jets).

Figure 4:
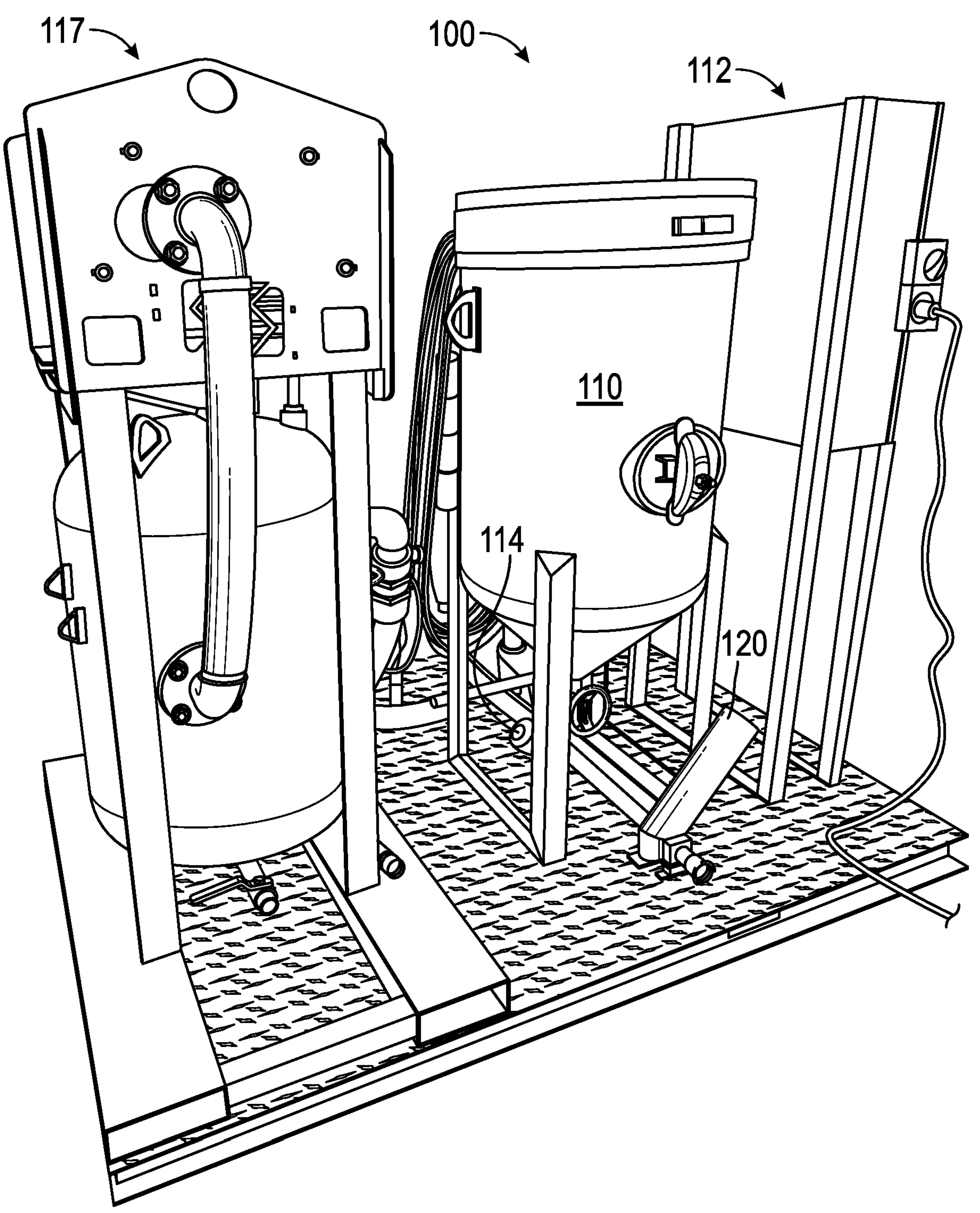
Figures 5C, 6:
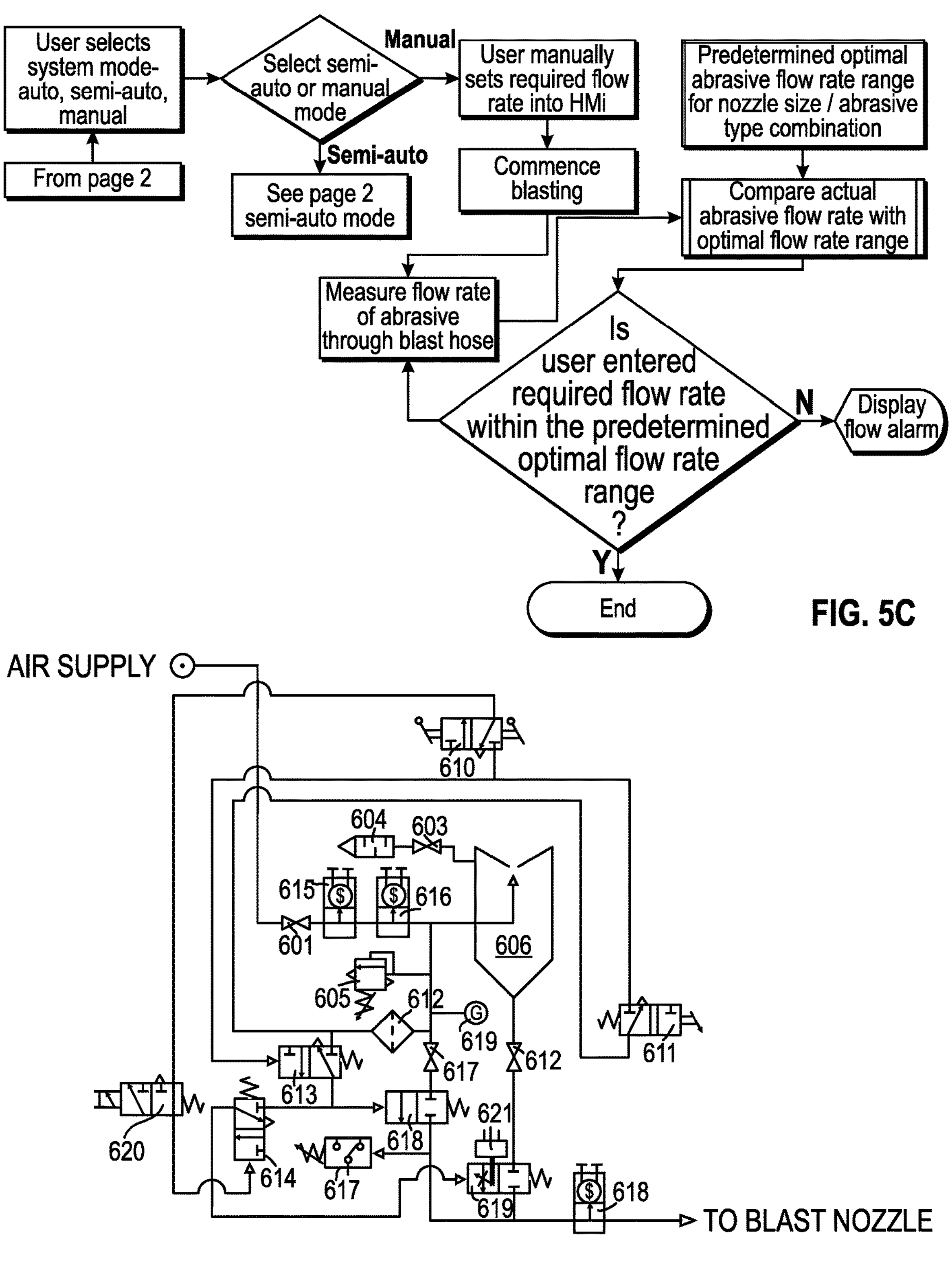
FIG. 5C shows a third page of the flowchart, being a page of the flowchart depicting a method for manually controlling abrasive flow in a pneumatic blasting apparatus.
FIG. 6 shows a Schematic of a Pneumatic Deadman system.

FIGS. 5A, 5B, and 5C show a detailed flow chart illustrating a method of controlling abrasive flow in a pneumatic blast pot arrangement 110 such as the one shown in FIGS. 2-4. FIGS. 5A, 5B, and 5C show the controller 112 configured to operate in three modes.

- 5A shows Auto mode—The controller is configured to optimise the use of abrasive during the blasting process by automatically controlling i.e. "adjusting" the abrasive flow rate to remain within the optimum abrasive flow rate range for the nozzle size and abrasive type combination in use.
- 5B shows Semi-Auto mode—The controller is configured to adjust the abrasive usage to a flow rate set by the operator.
- 5C shows Manual mode—The controller is configured to allow the operator to manually set an abrasive flow rate and simply triggers an alarm if the actual flow rate measures outside the manually set flow rate.

Figures 7, 8:
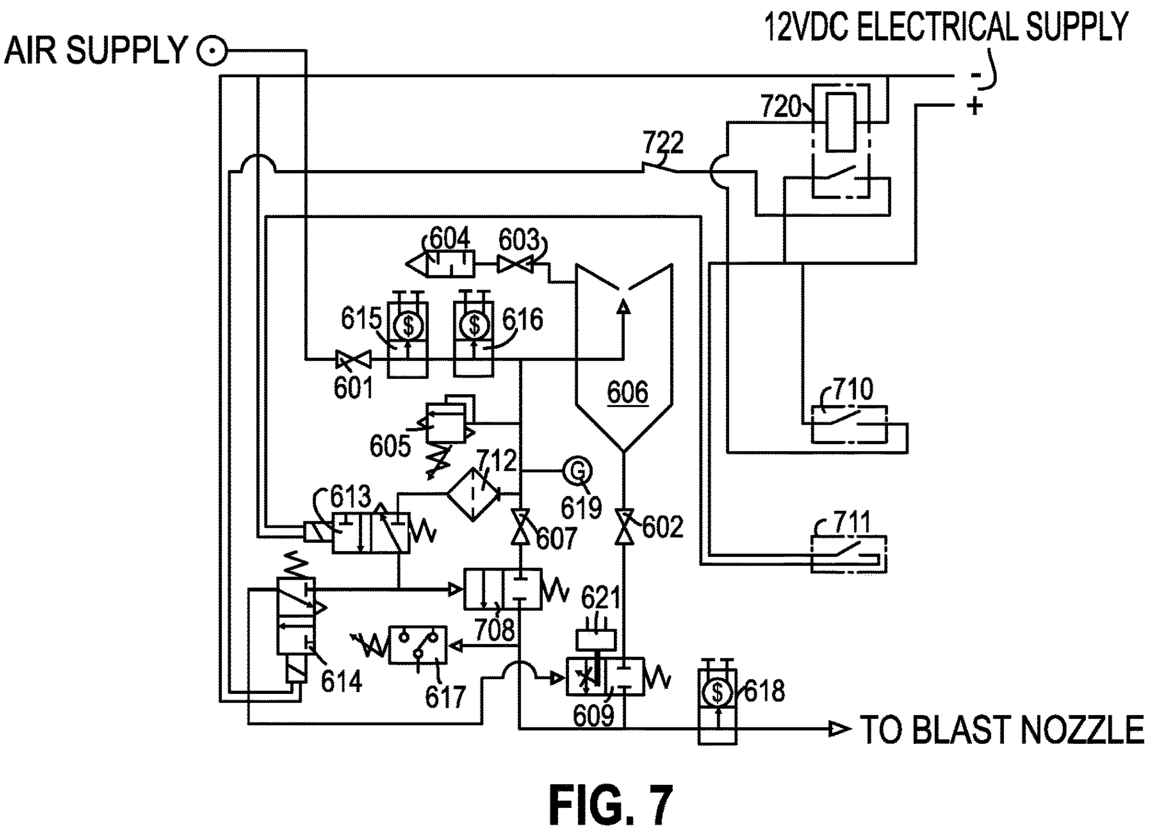
FIG. 7 shows a Schematic of an Electric Deadman system.
FIGS. 8 to 13 show examples of a user interface display screen for the automated abrasive control system shown in FIG. 2.
Figures 9, 10:
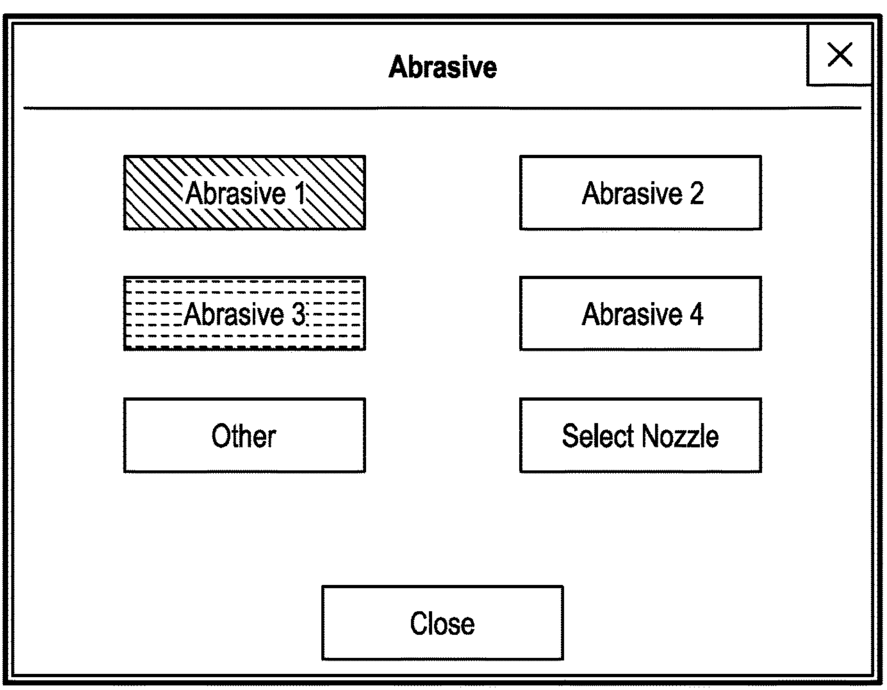
Figure 11:
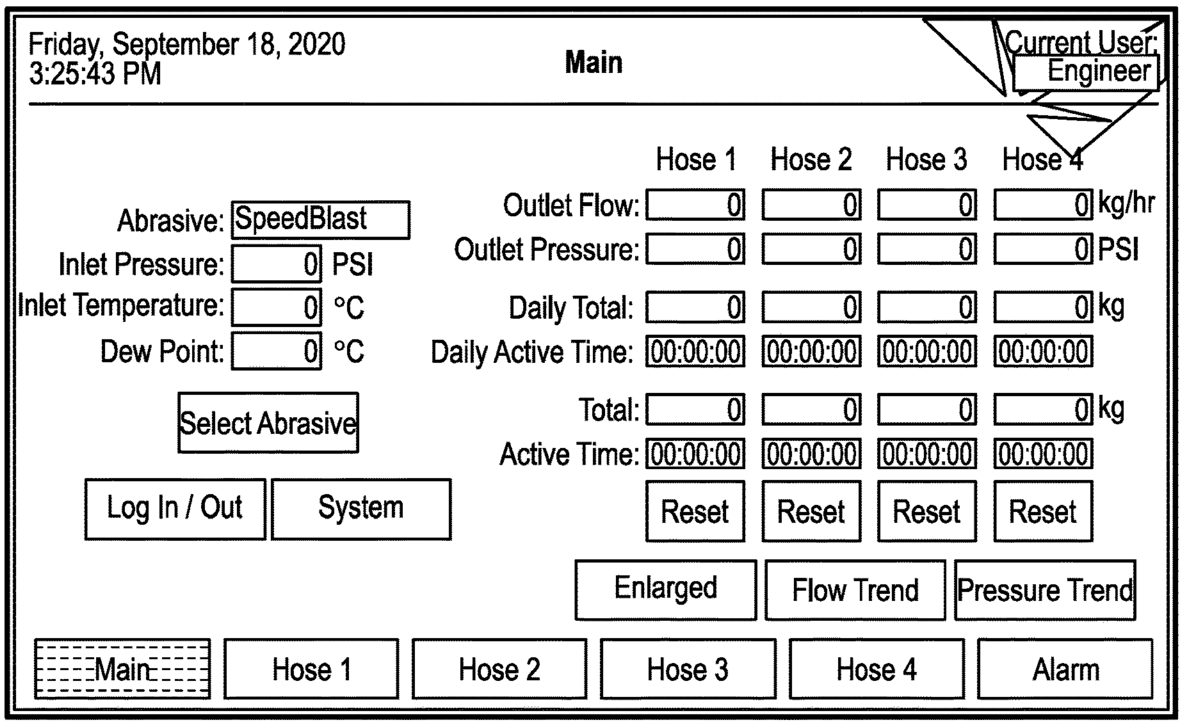
Figure 12:
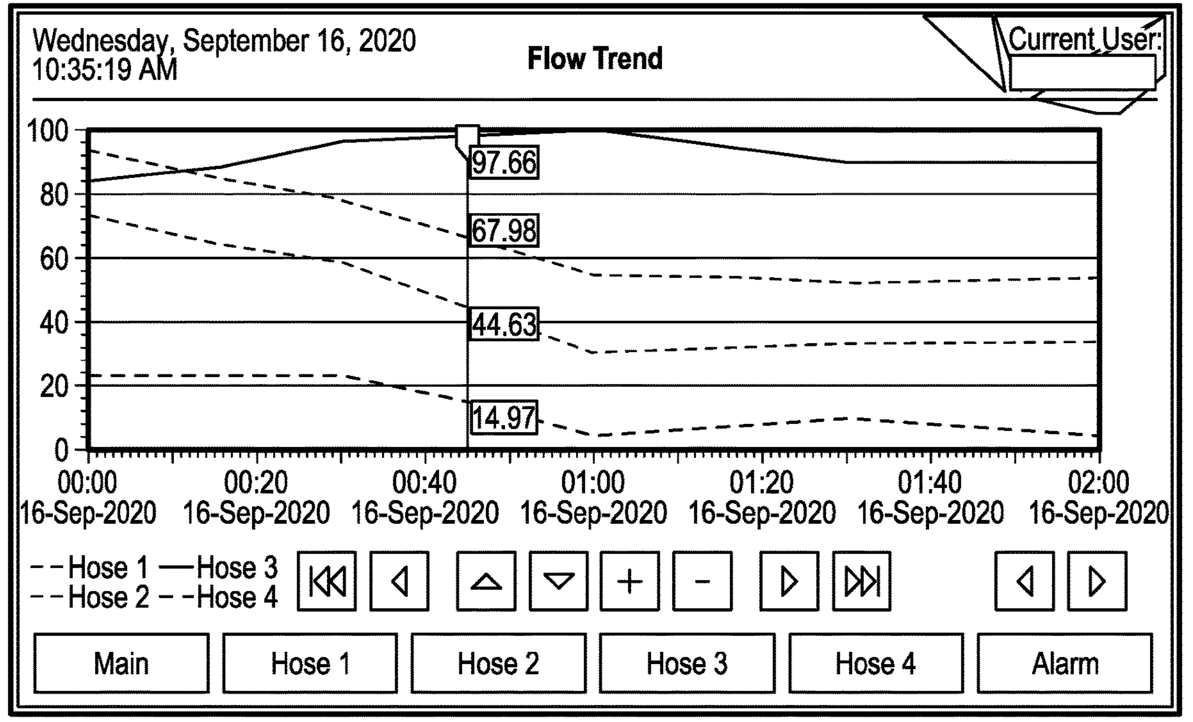
Figure 13:
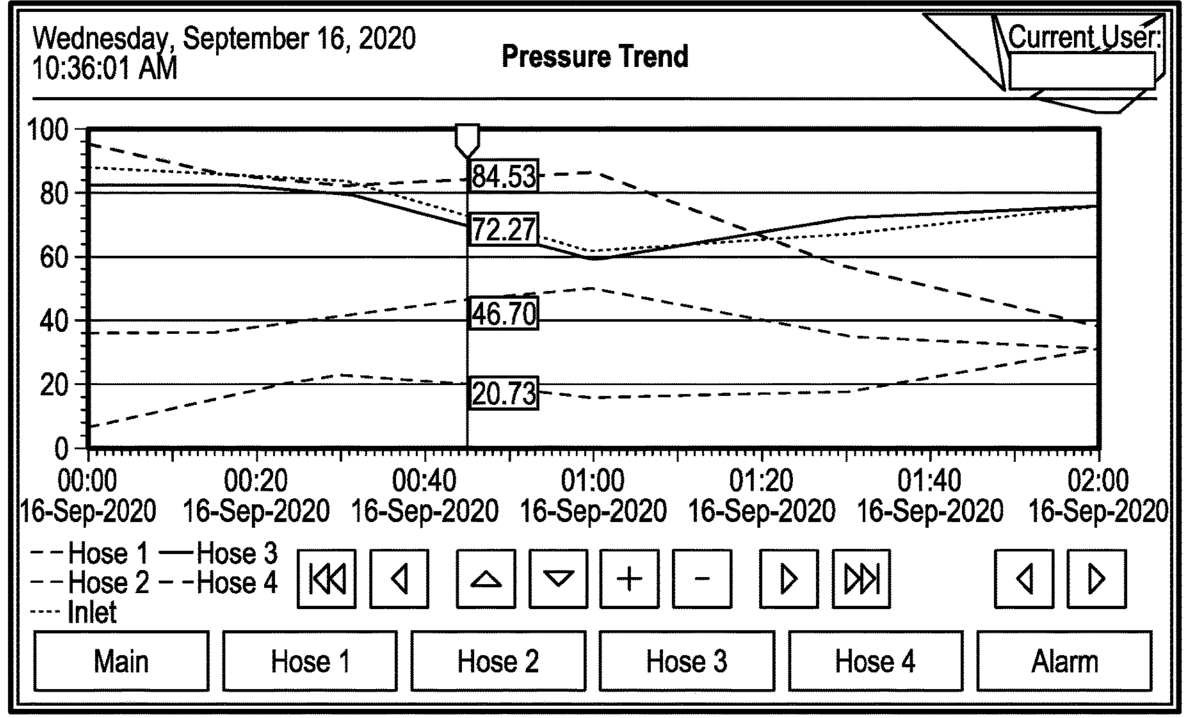

In Auto mode the operator selects a nozzle size and abrasive type using the user interface display screen as shown in FIGS. 8 and 9, and the controller 112 determines the abrasive flow rate based on a predetermined optimal range appropriate for the selected nozzle size and abrasive type. In semi-auto and manual mode, the predetermined abrasive flow rate is set by the operator.

In all three modes once blasting has commenced the abrasive flow rate sensor 120 measures the actual flow rate of the abrasive material and sends a signal to the controller 112.

In auto mode the controller 112 compares the actual flow rate with the predetermined optimum flow rate range based on the selected nozzle size and abrasive type combination. If the actual flow rate sensed is lower than the lower limit of the predetermined optimum flow rate range for the selected nozzle size and abrasive type combination, the controller 112 is configured to signal an actuator attached to the abrasive metering valve 114 to actuate and open the abrasive metering valve 114 a predetermined amount to allow more abrasive to flow through the abrasive metering valve 114 thereby increasing the flow rate of abrasive. The amount the abrasive metering valve 114 opens is based on the differential between the actual flow rate and the predetermined optimum flow rate. Likewise, if the measured, or actual flow rate is higher than the higher limit of the predetermined optimum flow rate range, the controller 112 is configured to signal the actuator attached to the abrasive metering valve 114 to actuate and close the abrasive metering valve 114 a predetermined amount to allow less abrasive to flow through the abrasive metering valve 114 thereby reducing the flow rate of abrasive.

In semi-auto mode, the controller 112 compares the actual flow rate with the operator entered flow rate and actuates the abrasive metering valve 114 to open or close to maintain the operator entered flow rate.

In manual mode, the controller 112 compares the actual flow rate with the operator entered flow rate, if the actual flow rate is outside the entered parameters, the controller 112 will simply signal an alarm (there is no auto adjustment of the abrasive metering valve 114).

The abrasive metering valve is electro mechanically actuated, by inclusion of a stepper motor though in other embodiments an electro-pneumatic actuator or a hydraulic actuator may be used or some other suitable actuating arrangement. on start up the controller 112 will drive the abrasive metering valve 114 to the home position to home the valve 114, immediately after reaching this position, the controller 112 will drive the abrasive metering valve 114 open a predetermined number of turns specific for the nozzle size selected on the user interface display screen 118. Once this position is achieved, adjustments of the abrasive metering valve 114 are made until the optimum abrasive flow rate is achieved. The adjustment range is based on the abrasive type and nozzle size and is programmable via the controller 112.

The Inventors have found that it is preferable to reduce the length of time, and number of sensing cycles, required to bring the system to within the optimal abrasive flow rate. This meant that in response to large differences between the optimal abrasive flow rate and the actual flow rate being sensed the controller was configured to apply a coarse adjustment whereas when small differences were sensed the controller was configured to only apply a fine adjustment. It was found that if a coarse adjustment was not used then it could take many fine adjustment cycles to achieve the optimal flow rate—during which time the blast operator could have stopped and started blasting numerous times, the system would read non optimal abrasive flow rate for the extended time it would take to achieve the target. If a fine adjustment was not used then the system might keep "hunting" to achieve the optimum flow rate i.e. the system could overshoot and then have to adjust in the opposite direction. By configuring the controller to use fine adjustment the possibility of such hunting occurring was reduced.

The Inventors also found that it is preferable that the abrasive metering valve is closed each time an adjustment takes place.

Closing the abrasive metering valve allows easier adjustment of the valve when using a mechanical actuator to adjust the abrasive metering valve. Pressure to the control line that acts to open and close the abrasive metering valve is shut off. This allows the abrasive metering valve to slam shut due to the action of the spring on the plunger. This releases tension on the spring and allows the valve spindle to be rotated by the actuator smoothly and with less required force. Pressure is then re-applied to the control line forcing the plunger to open to the new position—i.e. if the valve was opened then the air pressure in the control line will act against a reduced spring tension and open the plunger, if the valve was closed then air pressure in the control line will act against an increased spring tension causing the plunger to not open as far and therefore reduce abrasive flow rate. For a pneumatic actuator the pressure the control line that acts to open and close the metering valve is adjusted so that a reduced pressure will allow the tension in the valve spring to close the valve slightly and an increased pressure will overcome the valve spring tension to open the valve slightly. This adjustment continues throughout blasting operations when the flow rate is sensed to be outside the target range.

The time the abrasive metering valve (AMV) remains closed while it is adjusted is important because it is preferable that the operator does not sense that the abrasive has stopped flowing. Accordingly, it is preferable to set the time the AMV remains closed long enough to allow the adjustment to take place but short enough so the operator would not feel the abrasive not flowing (or to reduce this as much as possible).

During the blasting process, the abrasive flow sensor 120 continuously measures the rate of abrasive flow through the blast hose 116 and feeds it back to the controller 112. In Auto and semi-auto mode the process of adjusting the abrasive metering valve 114 continues to repeat such that the rate of abrasive flow remains within the predetermined range of abrasive flow for the selected nozzle size and abrasive type combination. The controller 112 will continuously receive the signal from the abrasive flow sensor 120 at a predetermined frequency. This allows time for the abrasive control system 100 to stabilise after the abrasive metering valve 114 has been actuated, and a new flow rate comparison and adjustment is made. This minimises the system 100 hunting and continuously adjusting.

Should the system 100 not be able to achieve the required abrasive flow rate for a predetermined period, or in other words, should the abrasive flow rate sensor 120 measure the abrasive flow rate to be outside of the predetermined flow rate for a predetermined period, the controller 112 will trigger a system alarm. The alarm may be displayed on the user interface screen 118 such as shown in FIG. 10. The alarm indicates the automated process of adjusting the abrasive flow rate described above has reached its limit and there is a problem with one or more of the system inputs. For example, there may be no abrasive in the blast pot 110 or there may be a problem with the air supply. The alarm will notify the operator the abrasive flow rate is outside the predetermined optimum range and needs to be rectified.

If the flow rate measured by the abrasive flow rate sensor 120 is too low for a predetermined period, the system 100 will 'auto choke.' Referring to FIG. 2, during operation the air pressure in the blast pot 110 and the blast hose 116 is equal, allowing the abrasive to enter the air stream at the blast pot 110 and continue through the blast hose 116. One possible reason for low abrasive flow rate may be a blockage. To release the blockage the controller 112 is configured to send a signal, which may be referred to as a "toggle signal" to a solenoid valve 122 which supplies air to the blast hose 116. The solenoid valve 122 closes and opens several times, promoting a higher pressure in the blast pot 110 than in the blast hose 116 when the solenoid valve 120 is closed, this 'choking' effect forces possible blockages in the abrasive metering valve 114 out and into the blast hose 116.

Advantageously, the controller 112 may be configured to independently monitor flow rate signals from abrasive flow rate sensors attached to a plurality of blast hoses and to independently and automatically adjust the abrasive flow rate via actuating the abrasive metering valve to any blast hose connected to the blast pot 110 in a similar way as described above.

As mentioned above the controller 112 may include a user interface display screen 118 such as shown in FIGS. 8-14. The display screen 118 may be a touch screen to enable operators to select system parameters and view displayed messages such as operating information, warning messages and alarms. Access to the touch screen user interface may be controlled by a user login system configured to provide a number of levels of user access.

FIGS. 6 and 7 show schematics of a blast pot control circuit for a pneumatic deadman system and an electric deadman system respectively. Both circuit diagrams also show the system and method for controlling abrasive flow through the blast pot arrangement.

In FIGS. 6 and 7, the various components and corresponding item numbers in the figures, are as set out in Table 2 below:

TABLE 2

FIGS. 6 and 7 Item Nos.

| Item No | Component |
|---|---|
| 601 | Air inlet ball valve |
| 602 | Union end ball valve |
| 603 | Blowdown ball valve |
| 604 | Exhaust air muffler |
| 605 | Safety valve |
| 606 | Blast pot |
| 607 | Choke valve |
| 608 | Auto air valve |
| 609 | Abrasive metering valve |
| 610 | Abrasive cutoff valve |
| 611 | Deadman handle |
| 612 | Strainer |
| 613 | Blast control valve |
| 614 | Abrasive control valve |
| 615 | Pressure/Temp/Flow sensor |
| 616 | Dewpoint sensor |
| 617 | Pressure transducer |
| 618 | Abrasive flow sensor |
| 619 | Pressure gauge |
| 620 | Metering control valve |
| 621 | Abrasive metering actuator |
| 710 | Abrasive cut-off switch |
| 711 | Electric Deadman handle |
| 720 | Relay |
| 722 | Metering control switch |

As described above, the abrasive metering valve 609 measures the abrasive flow to the blast nozzle and signals the controller. The abrasive control valve 614 is actuated by the abrasive metering actuator 621 to control the abrasive flow based on a signal received from the controller. Multiple sensors/transducers measure parameters such as pressure, temperature, and dew point.

A number of factors can cause blast hose air pressure and abrasive flow rate to fluctuate during the blasting process. When abrasive blasting is carried out in an environment where humidity is impacting the abrasive flow rate, the abrasive flow rate may become non-optimal. Advantageously, in these situations, the method described above can adjust the abrasive flow rate such that it remains within the predetermined optimum range of abrasive flow for the selected nozzle size and abrasive type combination without operator intervention.

Referring back to FIGS. 2A and 2B, blast pot inlet air pressure may be measured by air pressure sensor 130 fitted to the blast pot inlet air pipe 128. The air pressure sensor 130 is in communication with the controller 112, and during operation, the controller 112 monitors the signal from the inlet air pressure sensor 130 and is configured to compare the actual inlet air pressure measured by the inlet air pressure sensor 130 with a predetermined optimal inlet pressure range. If the measured inlet pressure is lower than the predetermined optimum range for inlet pressure the controller 112 is configured to trigger an inlet pressure alarm and display a warning on the user interface display screen 118.

If the measured inlet pressure is higher than the predetermined optimal inlet pressure range then a pressure relief valve (24 in FIG. 1) opens when actual pressure reaches the preset pressure.

Similarly, the blast pot inlet air temperature may be measured by sensor 130 and the dew point may be measured by the dew point sensor 132, both fitted to the blast pot inlet air pipe 128 and in communication with the controller 112. During operation, the controller 112 monitors the signal from the temperature sensor 130 along with the inlet air dew point measured by the dew point sensor 132 and compares the actual inlet air temperature with the actual dew point of the inlet air. If the inlet temperature sensed is equal to dew point for a predetermined period, such as 10 seconds, the controller 112 is configured to trigger a high air moisture content alarm and display a warning on the user interface display screen 118, such as "High air moisture content." Preferably, the alarm requires a reset to clear.

Still referring to FIGS. 2A and 2B, pressure sensor 124 measures the pressure in the pusher line 118. The sensor 124 is in communication with the controller 112. During operation, the controller 112 monitors the signal from the pressure sensor 124 and is configured to compare the actual pressure in the pusher line 126 with a predetermined optimal pressure range. If the measured pusher line pressure is outside the predetermined optimum range the controller 112 is configured to trigger a hose high or low pressure alarm (depending on actual pressure in the hose) and display a warning on the user interface display screen 118.

The physical location of the automated blast pot system 100 may be monitored by a Global Positioning System (GPS) connected to the controller 112 allowing the controller 112 to log the location of the automated abrasive control system 100 during operation.

FIGS. 8-13 show various screen shots of the user interface display screen 118. The automated abrasive control system 100 is configured to enable the operator to select various system parameters and inputs relevant to optimising the blasting process via the user interface display screen 118. System parameters may include blast nozzle (FIG. 8), abrasive type (FIG. 9), optimum inlet pressure range, optimum outlet pressure range, a predetermined abrasive type and blast nozzle combination to apply a predetermined optimum abrasive flow rate range, the duration each blast hose has been in operation and system alarm history.

The operator may also do the following via the user interface display screen 118:

1. reset system alarms;
2. reset information totalisers;
3. setup user security;
4. perform system admin tasks; and
5. set equipment maintenance intervals.

Abrasive type flow rate calibration data to the flow sensor may be input by a technician and is locked to prevent unauthorised changes.

The automated abrasive control system 100 is configured to log and record, at selectable intervals, system operational data from the various connected sensors and to calculate and display on the user interface display screen 118 various informative instantaneous and calculated trend information in various formats such as:

- instantaneous parameter values displayed in numerical format;
- parameter values totalled over a period displayed in numerical format;
- calculated instantaneous parameter values in numerical format; and
- parameter trend information displayed in chart format.

System parameters can be displayed in both metric and imperial standard units.

This functionality creates information enabling the following actual system parameters and performance to be displayed and monitored on the user interface display screen 118:

1. instantaneous blast pot inlet air pressure;
2. instantaneous blast pot inlet air temperature;
3. instantaneous blast pot inlet air dew point;
4. instantaneous pusher line air pressure for each and any connected hose;
5. instantaneous blast hose abrasive flow rate for each and any connected hose;
6. blast pot inlet air pressure trend;
7. blast pot inlet air temperature trend;
8. blast pot inlet air dew point trend;
9. blast pot outlet hose air pressure trend for each and any connected hose;
10. blast pot outlet hose abrasive flow rate trend for each connected hose;
11. totalised abrasive usage—daily and cumulative since last reset;
12. date and time;
13. type of abrasive media selected for use;
14. size of the abrasive nozzle selected for use;
15. geographical location of the automated blast pot system;
16. low abrasive flow alarm—by hose;
17. high abrasive flow alarm—by hose;
18. low inlet pressure alarm;
19. low outlet pressure alarm—by hose;
20. temperature equal to dew point—high air moisture content alarm; and
21. blast hose active time for each and any blast hose connected including daily and cumulative since last reset. This displays when a blast hose is active and records the duration the blast hose has been active over a timeframe selectable by the user. A blast host is considered to be active for the period of time when the pressure in the control line is recorded as being above a pre-set minimum pressure.

The automated abrasive control system 100 records the system parameter and performance information on an internal memory device within the controller 112. Information stored on the memory device can be accessed locally from a compatible device and downloaded to a selected location on the device.

A communication modem is connectable to the automated abrasive control system 100 and when energised and connected to a compatible mobile telecommunications network, information generated by the automated abrasive control system 100 can be exchanged between the automated abrasive control system 100 and a remotely connected device. Information generated by the automated abrasive control system 100 and displayed on the user interface display screen 118 can be viewed by operators from a remote location by connecting a compatible fixed or mobile device to the automated abrasive control system 100 via the connected communication modem.

Operators can remotely log in as a specific user (operator, supervisor or engineer) and select and view the user interface display screens, select and view and download various saved and real time information and change various parameters (e.g. alarm max. min thresholds) available based on the security level of the logged in role.

A cloud hosted user accessible dashboard is also developed and configured to display system parameter and performance information. Information generated by the automated abrasive control system 100 is uploaded at near real time intervals to a remotely hosted database and the dashboard application is programmed to calculate and display similar information to that available to be viewed on the user interface display screen 118. Users, or operators, are provided with an access code to gain access to the dashboard and can connect and view the dashboard remotely via network connected compatible devices.

An uninterruptable power supply with an internal battery is also connected to the automated abrasive control system 100 to provide system power for a predetermined time after the control panel is switched off. This provides power for a timeframe sufficient for the operating data stored in the local system memory to be uploaded to the remotely hosted database via the communication network.

In compliance with the statute, the invention has been described in language more or less specific to structural or methodical features. This to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. An automated abrasive control system for controlling abrasive flow in a pneumatic abrasive blast pot arrangement having at least one blast hose, the automated abrasive control system including:

an abrasive flow sensor for measuring abrasive flow rate through the at least one blast hose;

an abrasive metering valve for controlling the abrasive flow rate through the at least one blast hose; and a controller configured to receive a signal from the abrasive flow sensor and to actuate the abrasive metering valve based on a set of conditions, the set of conditions including an optimum abrasive flow rate range having an upper limit and a lower limit, and wherein the controller is configured to compare an actual abrasive flow rate sensed by the abrasive flow sensor with the optimum abrasive flow rate range and, if the actual abrasive flow rate is outside the optimum abrasive flow rate range, to actuate the abrasive metering valve to either open or close until the abrasive flow rate sensed by the abrasive flow sensor is within the optimum abrasive flow rate range;

wherein the controller is configured to determine the optimum abrasive flow rate range based on a combination of nozzle size and abrasive type; and wherein the automated abrasive control system further comprises a solenoid valve positioned on the at least one blast hose, wherein the controller is configured to send toggle signals to the solenoid valve if the abrasive flow rate is below the lower limit for a predetermined period, so that the solenoid valve closes and opens several times, promoting a higher pressure in the pneumatic abrasive blast pot arrangement than in the blast hose and forcing possible blockages in the abrasive metering valve out and into the blast hose.

2. The automated abrasive control system of claim 1, wherein the controller is configured to open the abrasive metering valve if the actual abrasive flow rate is lower than the lower limit of the optimum abrasive flow rate range and wherein the controller is configured to close the abrasive metering valve if the actual abrasive flow rate is higher than the upper limit of the optimum abrasive flow rate range.

3. The automated abrasive control system of claim 1, wherein the controller is configured to either open or close the abrasive metering valve based on a differential between the actual abrasive flow rate and the upper limit of the optimum abrasive flow rate range or the lower limit of the optimum abrasive flow rate range.

4. The automated abrasive control system of claim 1, wherein the at least one blast hose includes a plurality of blast hoses, each with a respective abrasive flow rate sensor and an abrasive metering valve, and the controller is configured to independently monitor flow rate signals from each abrasive flow rate sensor and to independently actuate each respective abrasive metering valve.

5. The automated abrasive control system of claim 1, wherein the controller is configured to receive a signal from the abrasive flow sensor and trigger an alarm based on a set of predetermined conditions.

6. The automated abrasive control system of claim 1, further including:

a plurality of sensors configured to measure system operating parameters, wherein the controller is responsive to the plurality of sensors; and a user interface display screen in communication with the controller wherein the controller is configured to operate the user interface display screen to display measured values of the system operating parameters.

7. The automated abrasive control system of claim 6, wherein the controller is configured to trigger an alarm if any of the measured system operating parameters are outside a predetermined range.

8. The automated abrasive control system of claim 6, wherein the system operating parameters include air pressure entering the pneumatic abrasive blast pot arrangement.

9. The automated abrasive control system of claim 6, wherein the system operating parameters include air temperature entering the pneumatic abrasive blast pot arrangement.

10. The automated abrasive control system of claim 6, wherein, the system operating parameters include dew point of air entering the pneumatic abrasive blast pot arrangement.

11. The automated abrasive control system of claim 10, wherein the controller is configured to compare a measured air temperature of air entering the pneumatic abrasive blast pot arrangement with a measured dew point of air entering the pneumatic abrasive blast pot arrangement, and if the measured air temperature is equal to the dew point for a predetermined period of time the controller is configured to trigger an alarm and display a warning on the user interface display screen.

12. A method for automatically controlling abrasive flow in a pneumatic abrasive blast pot arrangement having at least one blast hose, the method including:

providing a sensor for measuring abrasive flow rate through each of the at least one blast hose;

providing an abrasive metering valve responsive to the sensor;

providing a controller in communication with the sensor and the abrasive metering valve;

inputting at least one predetermined optimum abrasive flow rate range having an upper limit and a lower limit, for a combination of nozzle size and abrasive type, into the controller;

inputting a selected nozzle size and abrasive type combination into the controller, the controller being configured to determine an optimum abrasive flow rate range from the at least one predetermined optimum abrasive flow rate range based on the selected nozzle size and abrasive type combination;

measuring the abrasive flow rate through the at least one blast hose to determine a measured abrasive flow rate;

comparing, using the controller, the measured abrasive flow rate with the optimum abrasive flow rate range; and if the measured flow rate is outside the optimum abrasive flow rate range actuating via the controller the abrasive metering valve to open or close the abrasive metering valve to thereby bring the measured flow rate within the optimum abrasive flow rate range;

wherein the method further comprises:

providing a solenoid valve positioned on the at least one blast hose, wherein the controller is configured to send toggle signals to the solenoid valve if the abrasive flow rate is below the lower limit for a predetermined period, so that the solenoid valve closes and opens several times, promoting a higher pressure in the pneumatic abrasive blast pot arrangement than in the blast hose and forcing possible blockages in the abrasive metering valve out and into the blast hose.

13. The method of claim 12, wherein if the measured flow rate is higher than the upper limit of the optimum abrasive flow rate range the controller actuates the abrasive metering valve to close.

14. The method of claim 12, wherein if the measured abrasive flow rate is lower than the lower limit of the optimum abrasive flow rate range then the controller actuates the abrasive metering valve to open.

15. The method of claim 12, including:

storing a predetermined time limit for the measured abrasive flow rate to be out of range in the controller;

timing how long the measured abrasive flow rate is out of range; and signaling an alarm if the measured abrasive flow rate is out of range for a time that exceeds the predetermined time limit.

* * * * *